United States Patent
Ito

[11] Patent Number: 5,999,645
[45] Date of Patent: Dec. 7, 1999

[54] COLOR IMAGE FORMING APPARATUS HAVING FUNCTION FOR DUPLICATING IMAGE IN TWO DESIRED COLORS

[75] Inventor: Takanori Ito, Yokohama, Japan

[73] Assignee: Ricoh Co., Ltd., Tokyo, Japan

[21] Appl. No.: 08/738,081

[22] Filed: Oct. 25, 1996

[30] Foreign Application Priority Data

Oct. 27, 1995 [JP] Japan ................................. 7-281008

[51] Int. Cl.[6] ................................................ H04N 1/54
[52] U.S. Cl. ........................ 382/164; 358/529; 358/530
[58] Field of Search ........................ 358/518, 529–530, 358/537, 538; 382/164, 167; H04N 1/54

[56] References Cited

U.S. PATENT DOCUMENTS 5,105,267  4/1992  Hayashi ................................. 358/529
5,109,274  4/1992  Washio et al. ........................ 358/529

Primary Examiner—Kim Yen Vu
Attorney, Agent, or Firm—Oblon, Spivak, McClelland, Maier & Neustadt, P.C.

[57] ABSTRACT

A color image forming apparatus having a function for duplicating an image in two desired colors. A color of an image of an original document is read into color elements of a red (R), a green (G), and a blue (B) color, represented by corresponding image signals R, G, and B, respectively. The image processing unit distinguishes between a first case that the read color is a chromatic color and a second case that the read color is an achromatic color. When the color is distinguished as a chromatic color, the image processing unit converts the color into one of two predetermined colors, each defined by color elements C, M, Y, and K corresponding to image signals C, M, Y, and K, respectively. When the color is distinguished as an achromatic color, the image processing unit converts the color into the other one of the two predetermined colors. In accordance with such conversion of colors, the image processing units outputs image processing signals C, M, Y, and K representing corresponding color elements C, M, Y, and K, respectively, defining each of the two predetermined colors to reproduce an image in the two predetermined colors.

16 Claims, 13 Drawing Sheets

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| | | | | FULL COLOR | 100% | A4 LONG PHOTO ⋮ DARK | A3 LETTER ⋮ ● AUTO | AUTO STANDARD ⋮ LIGHT |

FIG. 3A

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| | | | | FULL COLOR | 100% | A4 LONG PHOTO ⋮ DARK | A3 LETTER ⋮ ● AUTO | AUTO STANDARD ⋮ LIGHT |

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| FULL COLOR | BLACK RED MAGENTA<br>YELLOW BLUE<br>GREEN CYAN | | | COLOR OF ORIGINAL DOCUMENT | REGISTERED COLOR NO. 1<br>REGISTERED COLOR NO. 2<br>REGISTERED COLOR NO. 3 | A4 LONG<br>PHOTO · · · · · ·<br>DARK | A3<br>LETTER<br>· · · · · ·<br>AUTO | AUTO<br>STANDARD<br>· · ·<br>LIGHT |

FIG. 3D

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| | | | | BLACK | 100% | A4 LONG<br>PHOTO · · · · · ·<br>DARK | A3<br>LETTER<br>· · · · · ·<br>AUTO | AUTO<br>STANDARD<br>· · ·<br>LIGHT |

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| | | | | TWIN COLOR RED | 100% | A4 LONG PHOTO ⋮ DARK | A3 LETTER ⋮ AUTO | AUTO STANDARD ⋮ LIGHT |
| | | | | COLOR CHANGE | | | | |

FIG. 4A

| COLOR EDIT | CREATE | IMAGE SHIFT | DELETE | COLOR SELECT | ENLARGE/REDUCT | ALL AREA | SELECT AREA | COMPOSIT AREA |
|---|---|---|---|---|---|---|---|---|
| COLOR SELECTION FOR TWIN COLORS | | | | REGISTERED COLOR NO. 1 | | A4 LONG | A3 | AUTO |
| RED MAGENTA COLOR OF ORIGINAL | | | | REGISTERED COLOR NO. 2 | | PHOTO | LETTER | STANDARD |
| YELLOW BLUE DOCUMENT | | | | REGISTERED COLOR NO. 3 | | ⋮ | ⋮ | ⋮ |
| GREEN CYAN | | | | | | DARK | AUTO | LIGHT |

FIG. 4B

| COLOR EDIT | CREATE | IMAGE SHIFT | DELETE | COLOR SELECT | ENLARGE/REDUCT | SELECT AREA |
|---|---|---|---|---|---|---|
| | | | | TWIN COLOR CYAN | 100% | ALL AREA / A4 LONG / PHOTO / DARK / SELECT AREA / A3 / LETTER / ● / AUTO / COMPOSIT AREA / AUTO / STANDARD / LIGHT |
| | | | | COLOR CHANGE | | |

FIG. 4C

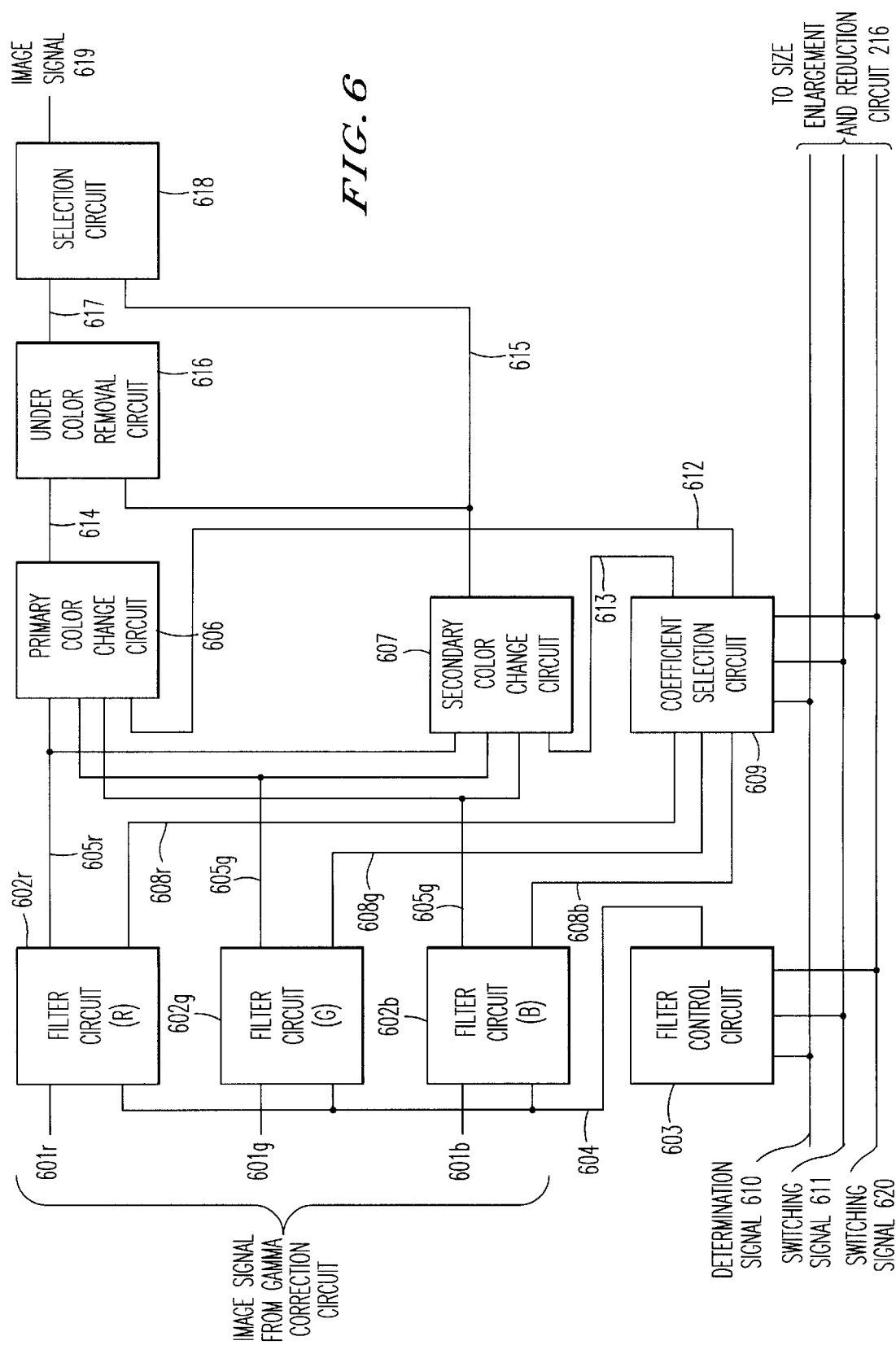

FILTER COEFFICIENT #0

MAIN SCANNING →

SUB-SCANNING ↓

$\frac{1}{128} \times$

| 1 | 3 | 4 | 3 | 1 |
|---|---|---|---|---|
| 3 | 8 | 10 | 8 | 3 |
| 4 | 10 | 12 | 10 | 4 |
| 3 | 8 | 10 | 8 | 3 |
| 1 | 3 | 4 | 3 | 1 |

*FIG. 7A*

FILTER COEFFICIENT #1

MAIN SCANNING →

SUB-SCANNING ↓

$\frac{1}{64} \times$

| 1 | 2 | 2 | 2 | 1 |
|---|---|---|---|---|
| 2 | 4 | 4 | 4 | 2 |
| 2 | 4 | 4 | 4 | 2 |
| 2 | 4 | 4 | 4 | 2 |
| 1 | 2 | 2 | 2 | 1 |

*FIG. 7B*

FILTER COEFFICIENT #2

MAIN SCANNING →

SUB-SCANNING ↓

$\frac{1}{64} \times$

| 0 | 1 | 2 | 1 | 0 |
|---|---|---|---|---|
| 1 | 4 | 6 | 4 | 1 |
| 2 | 6 | 8 | 6 | 2 |
| 1 | 4 | 6 | 4 | 1 |
| 0 | 1 | 2 | 1 | 0 |

*FIG. 7C*

FILTER COEFFICIENT #3

MAIN SCANNING →

SUB-SCANNING ↓

$\frac{1}{128} \times$

| 0 | 1 | 2 | 1 | 0 |
|---|---|---|---|---|
| 1 | 8 | 14 | 8 | 1 |
| 2 | 14 | 24 | 14 | 2 |
| 1 | 8 | 14 | 8 | 1 |
| 0 | 1 | 2 | 1 | 0 |

*FIG. 7D*

FILTER COEFFICIENT #4

MAIN SCANNING →

SUB-SCANNING ↓

$\frac{1}{16} \times$

| 0 | 0 | 0 | 0 | 0 |
|---|---|---|---|---|
| 0 | 1 | 2 | 1 | 0 |
| 0 | 2 | 4 | 2 | 0 |
| 0 | 1 | 2 | 1 | 0 |
| 0 | 0 | 0 | 0 | 0 |

*FIG. 7E*

FILTER COEFFICIENT #5

MAIN SCANNING →

SUB-SCANNING ↓

$\frac{1}{1} \times$

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

*FIG. 7F*

FILTER COEFFICIENT #6
MAIN SCANNING →

SUB-
SCANNING ↓

$\dfrac{1}{128} \times$

| 0 | -1 | -2 | -1 | 0 |
|---|----|----|----|---|
| -1 | 8 | 18 | 8 | -1 |
| -2 | 18 | 40 | 18 | -2 |
| -1 | 8 | 18 | 8 | -1 |
| 0 | -1 | -2 | -1 | 0 |

*FIG. 7G*

FILTER COEFFICIENT #7
MAIN SCANNING →

SUB-
SCANNING ↓

$\dfrac{1}{64} \times$

| -1 | -3 | -4 | -3 | -1 |
|----|----|----|----|----|
| -3 | 4 | 14 | 4 | -3 |
| -4 | 14 | 36 | 14 | -4 |
| -3 | 4 | 14 | 4 | -3 |
| -1 | -3 | -4 | -3 | -1 |

*FIG. 7H*

| RATIO OF ENLARGEMNET & REDUCTION (SEE NOTE) | TYPE OF IMAGE | DETERMINATION SIGNAL | | | |
|---|---|---|---|---|---|
| | | LINEAR IMAGE | | NON-LINEAR IMAGE | |
| | | BLACK & WHITE | COLOR | BLACK & WHITE | COLOR |
| 25 -70% | PHOTO | #4 | #3 | #1 | #0 |
| | LETTER | #6 | #5 | #3 | #2 |
| | STANDARD | #5 | #4 | #2 | #1 |
| 71 - 140% | PHOTO | #5 | #4 | #2 | #1 |
| | LETTER | #7 | #6 | #4 | #3 |
| | STANDARD | #6 | #5 | #3 | #2 |
| 141 - 400% | PHOTO | #4 | #3 | #1 | #0 |
| | LETTER | #6 | #5 | #3 | #2 |
| | STANDARD | #5 | #4 | #2 | #1 |

NOTE: A RATIO OF ENLARGEMENT AND REDUCTION IS EXPRESSED BY A SQUARE ROOT OF FIGURE MADE BY MULTIPLICATION OF ENLARGEMENT RATIO AND REDUCTION RATIO.

*FIG. 8*

COLOR IMAGE FORMING APPARATUS HAVING FUNCTION FOR DUPLICATING IMAGE IN TWO DESIRED COLORS

BACKGROUND OF THE INVENTION

1. Field of the Invention

This invention relates to a color image forming apparatus, and more particularly to a color image forming apparatus such as a color copying apparatus having a function for duplicating an image in two desired colors.

2. Discussion of the Background

With respect to a color image forming apparatus, such as a color copying apparatus capable of duplicating an image in two desired colors from an image of an original document, a first reference is made to an image reading apparatus disclosed in the official gazette for Laid Japanese Patent Application TOKUKAI HEI 5-37797. This image reading apparatus includes a function for converting image data into binary value data representing an achromatic color and another function for converting image data into binary value data representing a chromatic color. When reading an image of an original document, the image reading apparatus separates the image into plural color elements of red (R), green (G), and blue (B) and generates corresponding image signals of R, G, and B. The image reading apparatus then analyzes whether the image signals of R, G, and B are in a ratio of one to one to one, and, depending upon the result, selects one of the above-mentioned two functions to be implemented.

A second reference is made to an image forming apparatus disclosed in the official gazette for Laid Japanese Patent Application TOKUKAI HEI 6-152995. This image forming apparatus includes a function for converting image data into a black color signal and a red color signal to reproduce an image in a black and a red color. When reading an image of an original document, the image forming apparatus separates the image into plural color elements of cyan (C), magenta (M), and yellow (Y) to generate corresponding image signals of C, M, and Y. The image forming apparatus further generates a black color signal from a least value and the like of C, M, and Y and a red color signal by subtracting the least value and the like of C, M, and Y from the image signals of C, M, and Y.

A third reference is made to a product of a digital color copying apparatus referred to as PRETER 550 manufactured by Ricoh Company, Ltd., in Japan. This digital color copying apparatus includes a function for converting a color of an image of an original document into a different color of a duplicate image and, further, for designating such a color of the image of the original document and such a different color of a duplicate image when such conversion is executed.

However, in this apparatus a user may have difficulty in obtaining an image in superior color quality on the image reading apparatus of the above-mentioned first reference. This is because analysis as to whether the image signals of R, G, and B are in a ratio of one to one to one is too simple to determine a case of an achromatic color image and another case of a chromatic color image. More specifically, when an image is made of a black color or a high density gray color, each color element included in the image signals of R, G, and B is relatively small and the analysis therefore becomes inaccurate. In this case, an image which should be determined as an achromatic color image is improperly determined as a chromatic color image.

Also, in the image forming apparatus of the above-mentioned second reference, a problem is brought to a user in a way that an image portion to be printed in a red color is printed in a black color. This is because a black signal is generated from a least value and the like of C, M, and Y and a red color signal is generated by subtracting the least value and the like of C, M, and Y from the image signals of C, M, and Y. More specifically, when an image is made of a dark color, such as, for example, a dark red, a dark blue, or the like, each color element of C, M, and Y is relatively small and the analysis of the least value of C, M, and Y becomes inaccurate. In this case, an image which should be determined as a red color image is improperly determined as a black color image.

Also, in the digital color copying apparatus of the third reference, the two color copying function is complex to use. This is because that, in addition to selection of a color desired to be printed in a duplicate image, the user is required to select a color of an image of an original document.

Therefore, a background color image forming apparatus such as a color copying apparatus presently is not capable of reproducing an image in two desired colors in superior quality from an image of an original document, in a relatively simple operation.

SUMMARY OF THE INVENTION

Accordingly, an object of the present invention is to provide a novel color image forming apparatus, such as a color copying apparatus, which includes a function for reproducing an image in two desired colors in superior quality from an image of an original document.

Another object of the present invention is to provide a novel color image forming apparatus, such as a color copying apparatus, which includes a function for reproducing an image in two desired colors as set forth, and which provides a relatively simple operation for executing the function.

Another object of the present invention is to provide a novel color image forming apparatus, such as a color copying apparatus, which includes a function for reproducing an image in two desired colors as set forth, and which is configured in a relatively simple structure.

Another object of the present invention is to provide a novel color image forming apparatus, such as a color copying apparatus, which includes a function for reproducing an image in two desired colors as set forth, and which executes such a function in a relatively fast time.

In accomplishing these and other objects, there is provided, in accordance with the present invention, an improved and novel color copying apparatus including an image reading unit, an image processing unit, and a recording unit. The image reading unit reads an image of an original document by separating a color of the image into color elements of a red (R), a green (G), and a blue (B) color, and generates corresponding image signals representing R, G, and B, respectively. The image processing unit corrects the image signals R, G, and B with a number of signal processing circuits, such as, for example, an A/D (analog to digital) conversion, a gamma correction, and so forth. Further, the image processing unit distinguishes between a first case that the color defined by the color elements R, G, and B represented by the corresponding image signals R, G, and B is a chromatic color and a second case that the color defined by the color elements R, G, and B represented by the corresponding image signals R, G, and B is an achromatic color.

When the color is distinguished as a chromatic color, the image processing unit converts the color into one of two predetermined colors, each defined by color elements C, M, Y, and K corresponding to image signals C, M, Y, and K, respectively. When the color is distinguished as an achromatic color, the image processing unit converts the color into the other one of two predetermined colors, each defined by color elements C, M, Y, and K corresponding to image signals C, M, Y, and K, respectively.

In accordance with such conversion of colors, the image processing units outputs image processing signals C, M, Y, and K representing corresponding color elements C, M, Y, and K, respectively, defining each of the two predetermined colors. The recording unit accordingly records a duplicate image in accordance with the image signals C, M, Y, and K output from the image processing unit. Thereby, the color of the image of the original document is reproduced in one of the two predetermined colors when the color of the image is distinguished as a chromatic color and the other one of the two predetermined colors when the color of the image is distinguished as an achromatic color, respectively.

In accomplishing the same objects, there is also provided, in accordance with the present invention, another improved and novel color copying apparatus including the same image reading unit, another image processing unit, and the same recording unit. After reading a color of an image of an original document and generating image signals R, G, and B respectively representing color elements R, G, and B, the image processing unit corrects the image signals R, G, and B with a number of signal processing circuits, such as, for example, an A/D (analog to digital) conversion, a gamma correction, and so forth. Further, the image processing unit judges a level of chroma of the read color defined by the color elements R, G, and B represented by the corresponding image signals R, G, and B. Further, the image processing unit converts the read color into a mixed color of two predetermined colors with a predetermined mixing ratio in accordance with the judged level of chroma of the read color.

The image processing unit accordingly outputs image signals C, M, Y, and K representing corresponding color elements C, M, Y, and K defining the above-mentioned mixed color. A recording unit records a duplicate image in the mixed color in accordance with the corresponding image signals C, M, Y, and K output from the image processing unit. Thereby, the color of the image of the original document is reproduced in a mixed color of the two predetermined colors with a mixing ratio in accordance with the level of chroma of the read color defined by the color elements C, M, Y, and K represented by the corresponding image signals C, M, Y, and K, respectively.

Further, the improved and novel color copying apparatus includes, in addition, a color designating unit for designating a color for being reproduced, and of which the image processing unit selects such a color designated by the color designating unit as one of the two predetermined colors.

Further, the image processing unit of the improved and novel color copying apparatus includes a color correction circuit for defining, for example, six space units in a color space of R, G, and B by dividing the color space into the six space units by the same number of planes, each plane having an achromatic color axis as a common interfacing axis and a vertex extending to a direction different from other vertices of adjacent planes. The color correction circuit further determines a position of the color, which is defined by the color elements R, G, and B represented by the corresponding image signals R, G, and B, in one of the six space units in the color space. The color correction circuit then corrects the color by using a number of predetermined coefficients reserved for each of the six space units in the color space.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3(a)–3(d) and 4(a)–4(c) are illustrations of exemplary screen contents displayed on an operation panel for explaining a system control flow of the color copying apparatus shown in FIG. 1;

FIG. 6 is a block diagram of an exemplary configuration of the color correction circuit of the color copying apparatus shown in FIG. 1;

FIGS. 7(a)–7(h) are illustrations for explaining examples of filter coefficients selected by a filter circuit of the color copying apparatus shown in FIG. 1; and, FIG. 8 is a table for explaining filter coefficients selected and determined by a filer control circuit of the color copying apparatus shown in FIG. 1.

DESCRIPTION OF THE PREFERRED EMBODIMENTS

Figure 1:
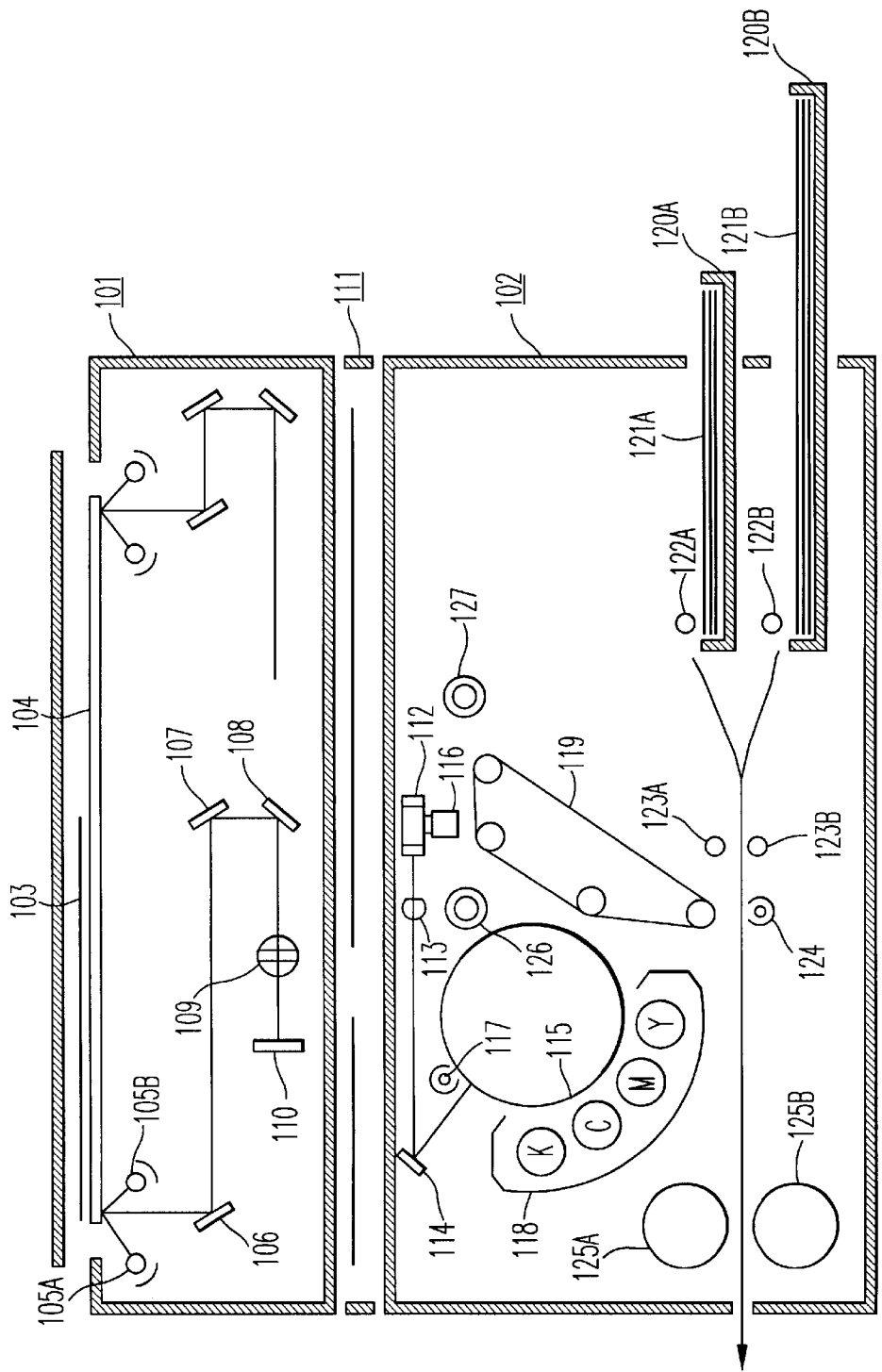
FIG. 1 is a schematic diagram of an exemplary structural configuration of a color copying apparatus embodying the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 2A:
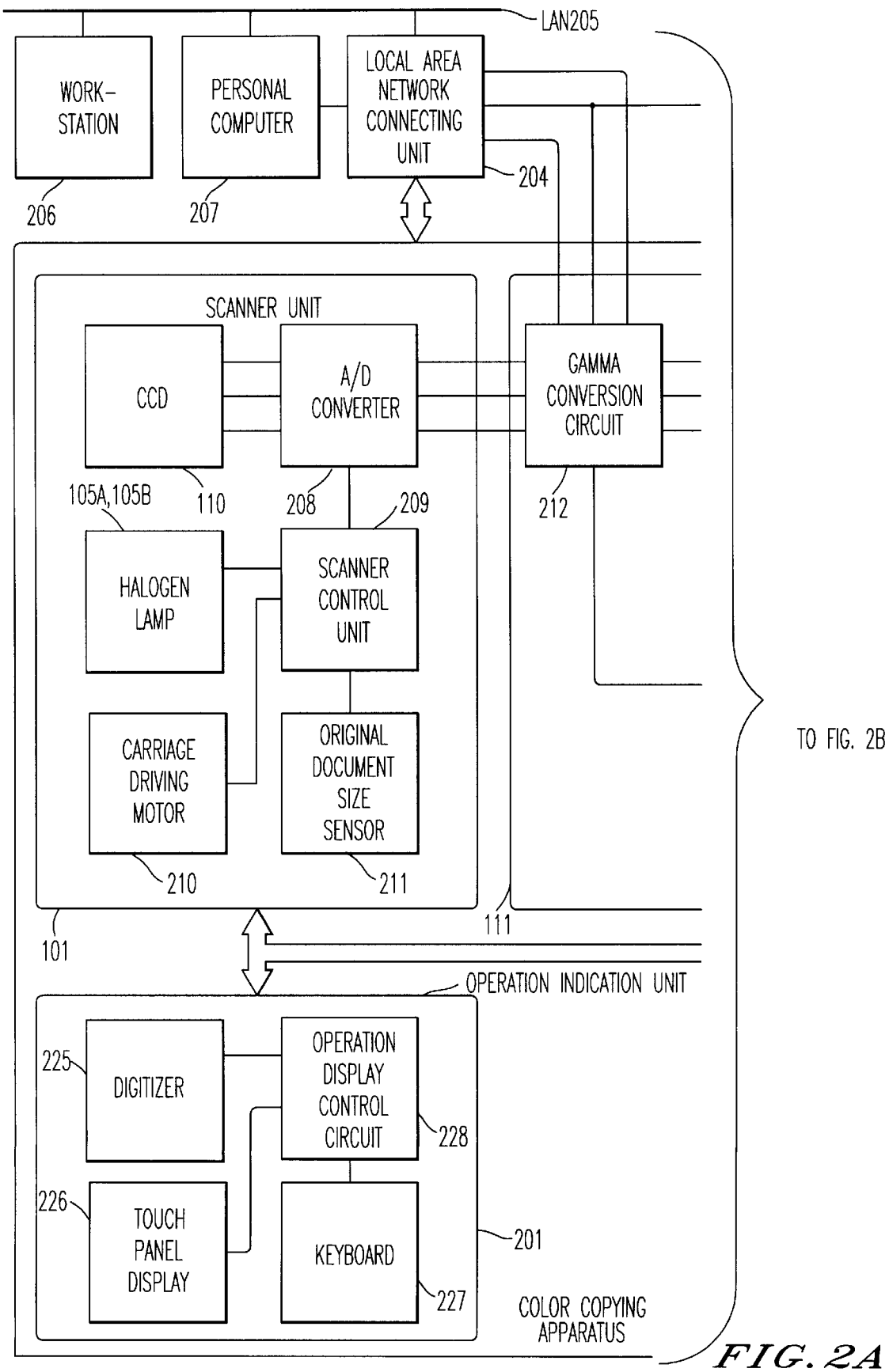
FIG. 2 is a block diagram of an exemplary electric configuration of the color copying apparatus shown in FIG. 1.
Figure 2B:
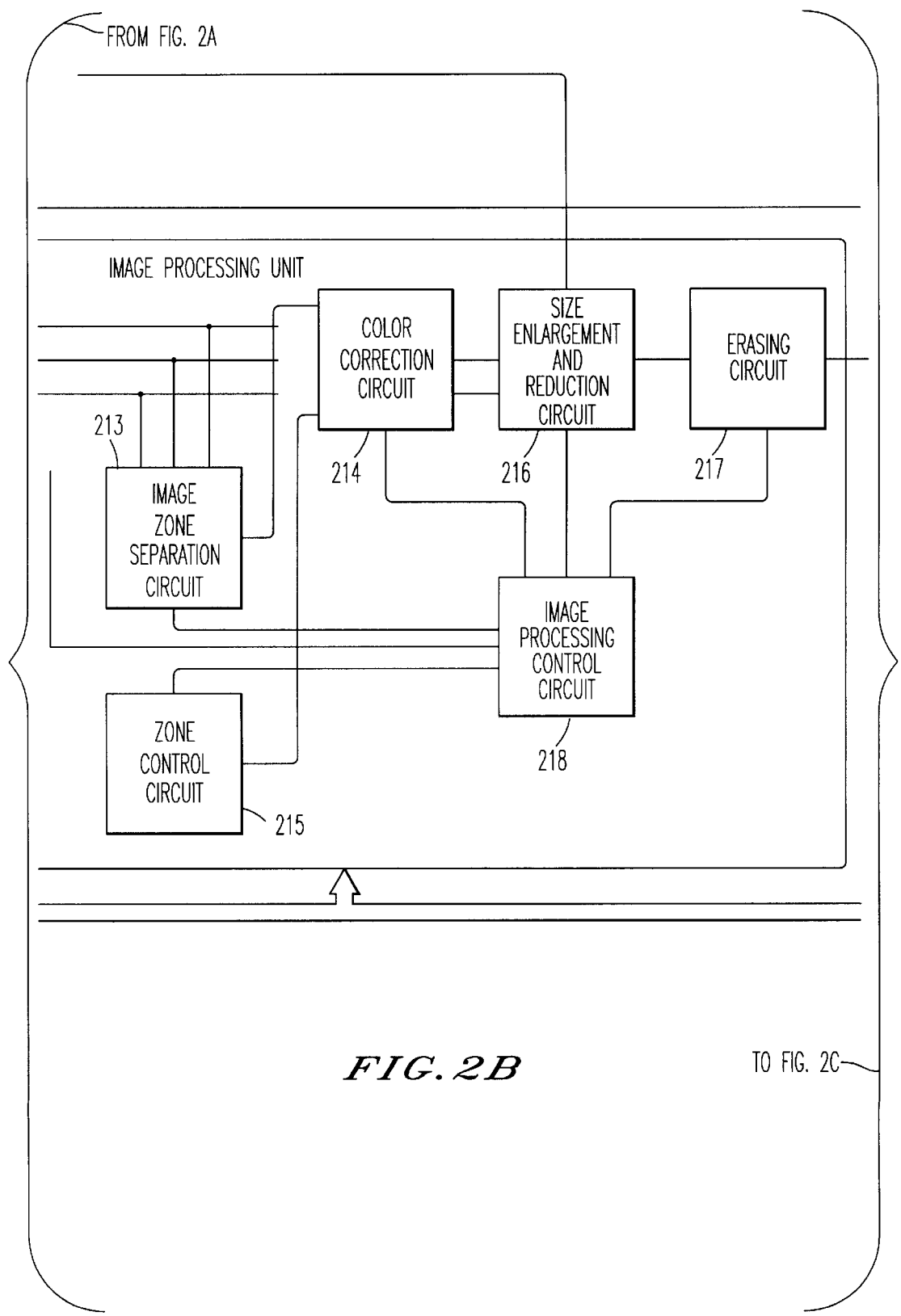
Figure 2C:
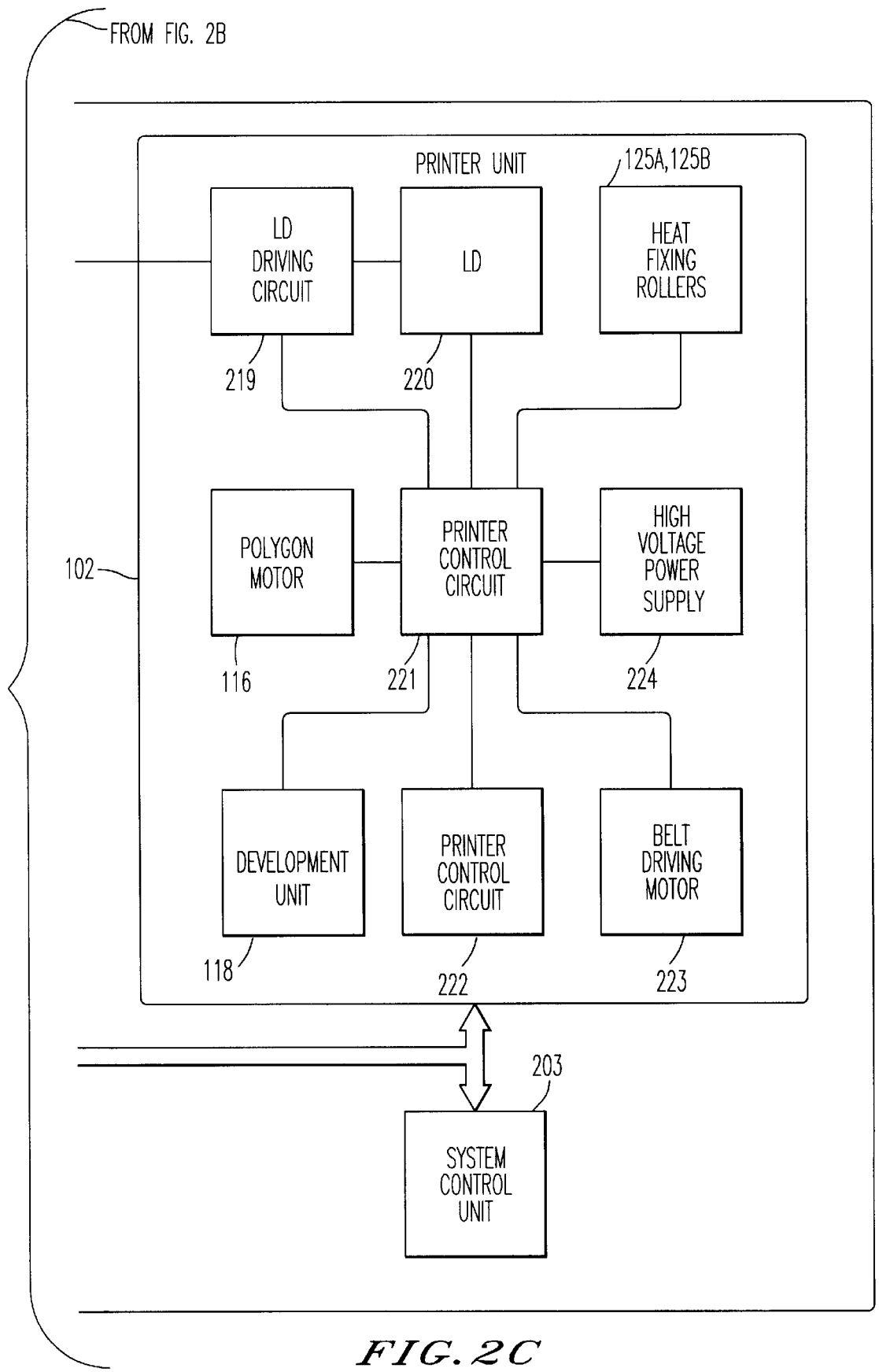

Referring now to the drawings, wherein like reference numerals designate identical or corresponding parts throughout the several views, and more particularly to FIGS. 1 and 2 thereof, a mechanical configuration and an electrical configuration of a color copying apparatus showing an exemplary embodiment of the present invention are respectively schematically illustrated.

The mechanical configuration of the color copying apparatus embodying the present invention shown in FIG. 1 includes a scanner unit 101 for reading an original document and a printer unit 102 for recording an image on recording paper.

The scanner unit 101 in FIG. 1 includes a platen 104 and a pair of halogen lamps 105a and 105b on a top part thereof. An original document 103 is placed on a predetermined region of the platen 104 and is illuminated by the pair of the halogen lamps 105a and 105b. A reflected light from the original document 103 in turn impinges on a set of mirrors 106, 107, and 108, passes through a lens 109, and then falls on a CCD (charge coupled device) 110 with focusing. The focused light on the CCD 109 is converted into an electrical signal or an image signal. The pair of the halogen lamps 105a and 105b and the mirror 106 are mounted on a first carriage which is not shown. The mirrors 107 and 108 are mounted on a second carriage which is also not shown. During a time when the original document is read, a driving motor which is not shown drives the first carriage and the second carriage to move from left to right in FIG. 1 at a speed proportion of two to one, respectively. A whole surface of the original document 103 placed on the platen 104 is thereby scanned. The image signal converted from the light by the CCD 110 receives various signal treatments in an image processing unit 111 and is applied to an LD (laser diode), which is not shown, in a printer unit 102. The LD converts the image signal into a laser beam.

In the printer unit 102, the laser beam from the LD is in turn reflected by a polygon mirror 112, passed through an fo lens 113, again reflected by a mirror 114, and falls, with focusing, on a rotating photoconductive drum 115, e.g., rotating counterclockwise. The polygon mirror 112 is secured to the rotary axis of a polygon motor 116 which rotates at a constant speed so as to drive the polygon mirror 112. By this rotation of the polygon mirror 112, the above-mentioned laser beam is driven to scan the surface of the photoconductive drum 115 in a transverse direction of the movement of the photoconductive drum 115 or in a parallel direction of the axis of the photoconductive drum 115. The direction of the movement of the surface of the photoconductive drum 115 may be referred to as a main scanning direction, while the direction of the movement of the polygon mirror 112 may be referred to as a sub-scanning direction, henceforth.

The surface of the photoconductive drum 115 is evenly charged in advance with a negative potential by a main charger 117 connected to a high voltage generating device which is not shown. When the surface of the photoconductive drum 115 is exposed by the laser beam, the charge on the surface of the photoconductive drum 115 is discharged to the device ground through a photoconductive phenomenon. A relatively strong laser beam is driven to represent a relatively light image density portion of the original document while a relatively weak laser beam is driven to represent a relatively dark image density portion of the original document 103. An electrostatic latent image of light and dark is thus formed in accordance with the light and dark image density of the original document 103 on the surface of the photoconductive drum 115 based on the movements by the polygon mirror 112 in the main scanning direction and by the photoconductive drum 115 in the sub-scanning direction.

A development unit 118 includes development devices K (black), C (cyan), M (magenta), and Y (yellow), containing negatively charged toner of black, cyan, magenta, and yellow, respectively, one of which development devices is selected. The selected development device is biased at a predetermined negative voltage by a high voltage generating device which is not shown, and, through a development process of the above-mentioned electrostatic latent image, forms an image made of toner with light and dark on the surface of the photoconductive drum 115 in accordance with the light and dark image density of the original document 103.

A transferring belt 119 is biased at a predetermined positive voltage by a high voltage generating device which is not shown, and rotates, e.g., clockwise, at a same speed as the photoconductive drum 115. The above-mentioned image made of toner on the surface of the photoconductive drum 115 is attracted by the bias force to the surface of the transferring belt 119 during a time when the photoconductive drum 115 and the transferring belt 119 come close to each other. At this time, a cycle of the above-mentioned operations, such as, reading the original document 103, forming an electrostatic latent image and transferring the image made of toner, is repeated for a number of required times. More specifically, in a full color mode in which colors of black (K), cyan (C), magenta (M), and yellow (Y) are used to create a full color, four cycles of the operations are required, in each cycle the development device K, C, M, or Y, being in turn selected in this order. The image thus formed of toner is transferred from the photoconductive drum 115 and is, with an accurate positioning, overlaid on the surface of the transferring belt 119. On the other hand, a single color mode, in which a single color of, such as, K, C, M, or Y, requires one cycle of the operations, selecting the respective development device K, C, M, or Y. Another single color mode, in which a single color of, such as, red (R), green (G), or blue (B), requires two cycles of the operations, selecting the development devices M and Y, C and Y, or C and M, in such order, respectively. There are provided several more color modes, such as, a color mode referring to a designated color in an original document color, another color mode referring to a registered color in a memory (not shown), and a twin color mode in which an image is reproduced in two designated colors from an image of an original document. In these color modes, a number of cycles of the above-mentioned operations is determined in accordance with a number of colors designated in each color mode.

Paper cassettes 120a and 120b contain recording paper 121a and 121b, respectively, and one paper cassette 120a, 120b is selected for supplying the recording paper. When the paper cassette 120a is selected, for example, the recording paper 121a is fed out of the paper cassette 120a by a feeding roller 122a and is transferred to a pair of registration rollers 123a and 123b. At this time, the pair of the registration rollers 123a and 123b is not rotating but starts its rotation at a predetermined timing in accordance with a position of an image made of toner on the surface of the rotating transferring belt 119, with a result of ejecting the recording paper 121a.

A transferring charger 124 is connected to a high positive voltage generating device which is not shown. By operation of the transferring charger 124, the image made of toner on the surface of the transferring belt 119 is transferred onto the fed recording paper 121a. At this time when the image made of toner is transferred onto the recording paper 121a, the transferring belt 119 is released from the bias voltage to accelerate transferring. The recording paper 121a being formed with the image made of toner thereon is transferred to a pair of heat fixing rollers 125a and 125b by which the image made of toner is fixed on the recording paper 121a, and the recording paper 121a is then ejected out of the machine.

The toner remaining on the surface of the photoconductive drum 115 is cleaned by a cleaning unit 126 so that the photoconductive drum 115 becomes ready for the next operation, and the toner remaining on the surface of the transferring belt 119 is also cleaned by a cleaning unit 127 so that the transferring belt 119 becomes ready for the next operation.

Next, the electric part of the color copying apparatus according to the present invention is explained with reference to FIG. 2. The electric part of the color copying apparatus in FIG. 2 includes the above-mentioned scanner unit 101, the image processing unit 111, the above-mentioned printer unit 102, an operation indication unit 201 for detecting and indicating an input such as a selection of a processing mode, and a system control unit 203 for controlling an entire operation of the color copying apparatus 202 through communication with the above-mentioned units. This exemplary embodiment of the color copying apparatus according to the present invention is connected to a LAN (local area network) connecting unit 204 so as to exchange image data with other apparatus, such as, for example, a workstation 206, a personal computer 207, and so forth, which are connected to a LAN 205.

The CCD 110 of the scanner 101 in FIG. 2 separates the input light into three color elements, R (red), G (green), and B (blue), and converts them into three analog image signals to output to an A/D (analog to digital) converter 208. The A/D converter 208 converts the three analog signals into three digital signals, and also corrects uneven light amount in the original document by the pair of the above-mentioned halogen lamps 105a, 105b, uneven sensitivity of photosensitive devices in the CCD 110, and an irregularly low voltage for a dark image.

A scanner control circuit 209 communicates with the system control unit 203, and controls an entire operation of the scanner 101. For example, an operation control of the A/D converter 208, an on and off control of the pair of the halogen lamps 105a and 105b, and a rotation control of the carriage driving motor 210 are controlled by the scanner control unit 209. In addition, an original document size sensor 211 for detecting a size of the original document 103 placed on the platen 104 outputs the detection result to the scanner control unit 209.

The image signals converted by the A/D converter 208 are input to a gamma conversion circuit 212 of the image processing unit 111.

The gamma conversion circuit 212 in the image processing unit 111 is connected to the LAN connecting circuit 204, and receives inputs from either the A/D converter 208 or the LAN connecting circuit 204. Since these inputs signals are not in proportion to a degree of image density or the like, the gamma conversion circuit 212 performs gamma conversion so that these input image signals represent a halftone image in proportion to the degree of image density of the image. After the conversion, the gamma conversion circuit 212 outputs the image signals to an image zone separation circuit 213 and color correction circuit 214. It is also possible that after receiving these signals from the A/D converter 208 and performing the conversion, the gamma conversion circuit 212 outputs these signals to the LAN connecting circuit 204.

The image zone separation circuit 213 determines whether or not an image portion under processing represents a linear image such as a text or the like, and whether an image portion under processing represents a black and white image or a color image, and outputs a determination signal for representing a result to the color correction circuit 214. A zone control circuit 215 generates a switching signal for switching over a type of processing depending upon a type of an image zone in the image, and sends the switching signal to the color correction circuit 214. The color correction circuit 214 provides the image signal from the gamma conversion circuit 212 with a color correction processing by which the received image signal is converted to represent an amount of toner of the selected development device to be required for recording. In addition, the color correction circuit 214 performs a filtering of two dimensions, such as, a processing for emphasizing an edge portion, a processing for smoothing an edge portion, and so forth. At this time, these operations are controlled by the above-mentioned determination signal and the switching signal.

For example, when the determination signal represents a linear image, the color correction circuit 214 performs a filtering processing emphasizing edges, and when the determination signal represents a nonlinear image, the color correction circuit 214 performs a filtering processing smoothing edges. On the other hand, there may be a case that the color correction circuit 214 performs a predetermined filtering processing regardless of the determination signal and switching signal.

The color correction circuit 214 performs its color correction processing in a similar manner to the above-mentioned filtering processing. For example, the color correction circuit 214 converts a required amount of toner suitable for a color mode, such as, a full color mode or a black mode, in accordance with the switching signal. Further, for example, in a full color mode, the color correction circuit 214 may set a UCR (under color removal) ratio at 100% when the determination signal indicates that the image is a linear image and a black and white image, or may set the UCR ratio at 70% when the determination signal indicates that the image is a non-linear image or a color image. The color correction circuit 214 outputs one image signal, a determination signal, and a switching signal to a size enlargement and reduction circuit 216.

The size enlargement and reduction circuit 216 enlarges or reduces the three signals from the color correction circuit 214 in the main scanning direction. In addition, the size enlargement and reduction circuit 216 performs a gamma correction processing for correcting a recording characteristic of the printer 102 with respect to image density varying with temperature, humidity, and so on. In addition, the size enlargement and reduction circuit 216 performs a halftone processing for representing a halftone image with resolution weighed or image density weighed in a unit of one or several picture elements in the main scanning direction and one or several picture elements in the sub-scanning direction. At this time, the gamma correction processing and the halftone processing are controlled by the above-mentioned determination signal and the switching signal.

For example, when the determination signal represents a linear image, a halftone processing with resolution weighed is performed, or when the determination signal represents a non-linear signal, a halftone processing with image density weighed is performed. In addition, the size enlargement and reduction circuit 216 performs another gamma correction processing associated with the halftone processing, because the recording characteristic of the printer 102 with respect to image density is varied depending upon a type of the halftone processing. Further, the size enlargement and reduction circuit 216 performs a predetermined halftone processing or gamma correction processing regardless of the determination signal. Enlargement and reduction of an image in the sub-scanning direction is performed by controlling the rotation of the above-mentioned carriage driving motor 210. Further, the size enlargement and reduction circuit 216 is connected to the LAN connecting unit 204, and outputs either a signal from the LAN connecting unit 204 or the image signal which has received various processing as mentioned above, together with a switching signal, to an erasing circuit 217. Depending upon the settings, the size enlargement and reduction circuit 216 may output the image signal which has received various processing as mentioned above to the LAN connecting unit 204.

The erasing circuit 217 puts a predetermined value, such as a value of depositing a least toner amount, to the received image signal in accordance with the switching signal and the settings. This operation is made for prohibiting an unnecessary image from being written in accordance with a size of the original document 103 detected by the original document size sensor 211, or a size of the recording paper 121a or 121b contained in the selected respective paper cassette 120a or 120b.

An image processing control circuit 218 communicates with the system control unit 203, and controls an entire operation of the image processing unit 111 by performing various settings of the above-mentioned gamma conversion circuit 212, the image zone separation circuit 213, the color correction circuit 214, the zone control circuit 215, the size enlargement and reduction circuit 216, and the erasing circuit 217, in accordance with an instruction from the system control unit 203.

The image signal output from the erasing circuit 217 is applied to an LD (laser diode) driving circuit 219 in the printer unit 102. The LD driving circuit 219 in the printer unit 102 performs processing, such as, a pulse width modulation, a power modulation, and so on, and then outputs a driving signal for driving an LD (laser diode) 220. The light strength of the LD 220 is thus controlled.

A printer control circuit 221 communicates with the system control unit 203, and controls an entire operation of the printer unit 102 by performing various controls. For example, the printer control circuit 221 controls each of the LD driving circuit 219 to enforce turning off the light of the LD 220, the polygon motor 116, rotation of a drum driving motor 222 for driving the photoconductive drum 115 and a belt driving motor 223 for driving the transferring belt 119, selection of the development devices K, C, M, and Y of the development unit 118, outputting of a high voltage power supply 224 for each load, such as, for example, the main charger, a development portion, the transferring belt 119, the transferring charger 124, and so forth, temperature of the heat fixing rollers 125a and 125b, and so forth. In addition, the printer unit 102 includes a paper size sensor, which is not shown, for detecting a size of the recording paper 121a and 121b contained in the respective paper cassettes 120a and 120b, and a result of the detection is output to the printer control circuit 221.

As the end of this electrical configuration section in FIG. 2, the operation indication unit 201 is explained. The operation indication unit 201 includes a digitizer 225 for inputting data for designating a predetermined zone or position on the original document 103, a TPD (touch panel display) 226 composed of a display portion for displaying various selections associated with modes and a status of the selected mode and a detecting portion for detecting a depressed position in the display portion, a keyboard 227 for inputting numbers of copy, a copy start, and so forth, and an operation display control circuit 228. The operation display control circuit 228 operates to display various selectable items in each mode on the TPD 226 to request a user response such as a key entry or the like. Further, the operation display control circuit 228 operates to detect an input from the digitizer 225, the TPD 226, or the keyboard 227 and, if any, operates to display a status of the settings on the TPD 226. In addition, the operation display control circuit 228 communicates with the system control unit 203, for sending information such as a result of inputting and the like.

Next, an outline of a control sequence of the color copying apparatus according to the present invention is explained with respect to exemplary display contents displayed on the TPD 226 as shown in FIGS. 3(a)–3(d).

When the color copying apparatus is in an initial condition, the operation indication control circuit 228 is set at an initial condition and operates to display an initial page on the TPD 226 as shown in FIG. 3(a), as an example. In FIG. 3(a), there are shown "COLOR EDIT", "CREATE", "IMAGE SHIFT", "DELETE", "COLOR SELECT", and "ENLARGE/REDUCT". These are selectable keys reserved for various functions of image manipulation, such as a color change, an image deletion, an image shift, and so forth, as examples. For further examples, in a block underneath "COLOR SELECT", there will be shown a designated color mode, such as, for example, "FULL COLOR" or the like as shown in FIG. 3(a), or further selectable items as shown in FIG. 3(c). For a further example, in a block underneath "ENLARGE/REDUCT", there will be shown a figure indicative of a ratio of an enlargement or reduction of an image, "100%", as example.

There are further shown selectable keys "ALL AREA", "SELECT AREA", and "COMPOSIT AREA" for designating an area of an image, such as, for example, a whole area of an image, a designated area, and so forth. There are further shown selectable keys "A4 LONG", "A3", and "AUTO" for designating a size of a paper of an original document, such as, for example, an A4 paper size in a longitudinal direction, an A3 paper size, and an automatic mode in which a paper size is automatically selected. There are further shown selectable keys "PHOTO", "LETTER", and "STANDARD" for designating a type of an image, such as, for example, an image of photos, an image of letters, and an image of both photos and letters. There are still further a slidable button and selectable keys "DARK", "AUTO", and "LIGHT" for designating image density of an image.

In FIG. 3(a) in the right, there are shown "PHOTO", "LETTER", and "STANDARD", which are selective quality modes by based on a type of image. When one of these quality modes is depressed by an operator, a respective mode is selected; "PHOTO" as a photo mode suitable for a photo image, "LETTER" as a letter mode suitable for a letter image, and "STANDARD" as a standard mode suitable for a mixed photo and letter image.

For example, when "LETTER" is depressed, the operation indication control circuit 228 detects this depression and then displays "LETTER" with a frame as shown in FIG. 3(b) to indicate to the operator that the depression is accepted. In addition, the operation indication control circuit 228 sends to the system control unit 203 a request for setting up the circuitry for the letter mode. Upon receiving the request, the system control unit 203 instructs the image processing circuit 218 to set up the circuitry for the letter mode. The image processing circuit 218 then sets up the circuitry including the zone control circuit 215, the color correction circuit 214, the size enlargement and reduction circuit 216, and so forth, for the letter mode. As an example of the operation, the image processing circuit 218 sets these circuits so as to let these circuits perform various processing, such as, for example, the filtering processing with the edge emphasizing weighed, a halftone processing with the resolution weighed, and the respective gamma correction processing, regardless of what the determination signal indicates.

A key "COLOR SELECT" in the initial page shown in FIGS. 3(a)–3(d) is used when selection of color modes is desired. With "COLOR SELECT" being pressed, the operation and indication control circuit 228 detects this key being pressed and then displays an exemplary menu page for indicating selective color modes to be set as shown in FIG. 3(c), following which process the operator can select a desired color mode such as a full color mode and so on. In FIG. 3(c), there are shown various selectable keys "FULL COLOR" and "TWIN COLOR" for designating a full color mode or a twin color mode, "BLACK", "RED", "MAGENTA", "YELLOW", "BLUE", "GREEN", "CYAN", "COLOR OF ORIGINAL DOCUMENT", "REGISTERED COLOR NO.1", "REGISTERED COLOR NO.2", and "REGISTERED COLOR NO.3" for designating desired colors of an image of an original document or a duplicate.

When the operator presses "BLACK", for example, in the menu page shown in FIG. 3(c), the operation indication control circuit 228 detects this key being pressed and then displays another exemplary menu page as shown in FIG. 3(d) to indicate to the operator that the pressing of the key "BLACK" is accepted. After that, the operation indication control circuit 228 sends to the system control unit 203, a request for setting up the circuitry for a black mode. Upon receiving this request, the system control unit 203 instructs the image processing control circuit 218 to set up the circuitry for the black mode. The image processing control circuit 218 then sets up the circuitry including the zone control circuit 215, the color correction circuit 214, and so forth, for the black mode.

As an example of the operation, the image processing control circuit 218 sets up the circuitry so as to let the color correction circuit 214 perform the color correction in which a toner amount to be used in a color mode for other than the black mode is converted into that to be used in the black mode. At the same time, the system control unit 203 instructs the printer control circuit 221 to operate under the black mode. Under these instructions, the printer control circuit 221 operates in the black mode during the copying operation, and controls a series of operations, such as, selecting the development device K, reading the original document 103, forming an electrostatic latent image, visualizing the image by toner, transferring the image made of toner onto the transferring belt 119, and then transferring the image from the transferring belt 119 onto the recording paper 121a or 121b.

Next, a control sequence when a twin color mode is selected is explained. In this embodiment of the color copying apparatus according to the present invention, colors of a twin color mode are defined as a basic black color and any additionally desired color. Therefore, a twin color mode may henceforth be referred to as "a twin color mode of red" or "a red twin color mode", as examples, which means the twin color mode with the basic black color and a red color available.

When the operator presses "TWIN COLOR" in the color mode selection block in the exemplary menu page shown in FIG. 3(c), the operation indication control circuit 228 detects this key being pressed and then displays another exemplary menu page as shown in FIG. 4(a) to indicate to the operator that the twin color mode of red is selected by "TWIN COLOR RED" and the color can be changed to a desired color by "COLOR CHANGE". The operation indication control circuit 228 sends to the system control unit 203 a request for setting up the circuitry for the twin color mode of red. Upon receiving the request, the system control unit 203 instructs the image processing control circuit 218 to set up the circuitry for the red twin color mode. The image processing control circuit 218 then sets up the circuitry, such as, the zone control circuit 215, the color correction circuit 214, and so forth, for the red twin color mode.

As an exemplary operation, the image processing control circuit 218 sets up the circuitry so as to let the color correction circuit 214 perform the color correction in which a toner amount to be used in a color mode for other than the red twin color mode is converted into that to be used in the red twin color mode. Further, the system control unit 203 instructs the printer control circuit 221 and so forth to operate under the red twin color mode. Under these instructions, the printer control circuit 221 operates in the red twin color mode during the copying operation, and controls a series of operations, such as, selecting in turn the development devices K, Y, and M in this order, reading the original document 103, forming an electrostatic latent image, visualizing the image by toner, transferring the image made of toner onto the transferring belt 119, and, after three times of this transferring operation, transferring the image from the transferring belt 119 onto the recording paper 121a or 121b.

The twin color mode of red is set as a default twin color mode in this embodiment of the color copying apparatus, since the red color is the color most frequently chosen for the twin color mode. Other colors may however be selected by pressing "COLOR CHANGE" in the "COLOR SELECT" block in the exemplary menu page shown in FIG. 4(a). The operation indication control circuit 228 detects this key being pressed by the operator, and displays another exemplary menu page for indicating selective twin color modes to be set as shown in FIG. 4(b) in which "COLOR SELECTION FOR TWIN COLORS" is displayed to request an operator response. The operator can accordingly select a desired color other than the red color, thereby turning into a twin color mode with a desired color.

With "CYAN", for example, being pressed in the exemplary menu page shown in FIG. 4(b), the operation indication control circuit 228 detects this key being pressed, and then displays another exemplary menu page as shown in FIG. 4(c) to indicate to the operator that the twin color mode of cyan is selected by "TWIN COLOR CYAN" and the color can still be further changed by pressing the "COLOR CHANGE" key. The operation indication control circuit 228, in addition, sends to the system control unit 203 a request of setting up the circuitry for the twin color mode of cyan. Upon receiving the request, the system control unit 203 instructs the image processing control circuit 218 to set up the circuitry for the twin color mode of cyan. Under these instructions, the image processing control circuit 218 sets up the zone control circuit 215, the color correction circuit 214, and so forth, for the cyan twin color mode.

As an example of the operations, the image processing control circuit 218 sets up the circuitry into the cyan twin color mode so as to let the color correction circuit 214 perform the color correction in which a toner amount to be used in a color mode for other than the red twin color mode is converted into that to be used in the cyan twin color mode. Further, the system control unit 203 instructs the printer control circuit 221 and so forth to operate under the cyan twin color mode. Under these instructions, the printer control circuit 221 operates in the cyan twin color mode during the copying operation, and controls a series of operations, such as, selecting in turn the development devices K and C in this order, reading the original document 103, forming an electrostatic latent image, visualizing the image by toner, transferring the image made of toner onto the transferring belt 119, and, after two of these transferring operations, transferring the image from the transferring belt 119 onto the recording paper 121a or 121b.

Keys "Registered Color 1" through "Registered Color 3" in the color selection block in the exemplary menu page as shown in FIGS. 3(c) and 4(b) are preset colors each determined by a mixing ratio of toner amounts of the development devices C, M, Y, and K, and are selectable as a color for a twin color mode. Key "COLOR OF ORIGINAL DOCUMENT" in the color selection block is selected when a color represented in an original document is selected as a color for a twin color mode. In this case, following instructions on the TPD 226 and using the digitizer 225, the operator can select a desired color by entering a position in the digitizer corresponding to a place where a desired color appears in an original document for selecting colors. At this time, the system control unit 203 controls the scanner control circuit 209 to read the color selection original document placed on the platen 104, and also controls the image processing control circuit 218 to sample the image signal for the area designated by the operator through the digitizer 225. Further, the system control unit 203 controls the image processing control circuit 218 to determine a suitable mixing ratio of toner amounts of the development devices C, M, Y, and K, on the basis of the sampled image signal.

Information of the thus determined mixing ratio of toner amounts of the development devices C, M, Y, and K is sent to the image processing control circuit 218 by the system control unit 203, when the system control unit 203 sends a request for setting up the circuitry for a twin color mode. The image processing control circuit 218 then sets up the zone control circuit 215, the color correction circuit 214, and so forth.

For example, the image processing control circuit 218 sets up the circuitry so as to let the color correction circuit 214 perform the color correction in which a toner amount is converted into that to be used in the twin color mode determined by a mixing ratio of toner amounts of the development devices C, M, Y, and K. Further, the system control unit 203 instructs the printer control circuit 221 and so forth to operate under the twin color mode determined by a mixing ratio of toner amounts of the development devices C, M, Y, and K. Under these instructions, the printer control circuit 221 operates in this twin color mode during the copying operation, and controls a series of operations, such as, selecting in turn the development devices K, C, M, and Y, in this order, reading the original document 103, forming an electrostatic latent image, visualizing the image by toner, transferring the image made of toner onto the transferring belt 119, and, after the necessary times of this transferring operation, transferring the image from the transferring belt 119 onto the recording paper 121a or 121b. In this operation, when any toner amount of the development devices C, M, Y, and K is determined as 0, an operation for selecting this development device is omitted.

Under the condition as shown in FIG. 4(c), when the operator presses a key which is not shown for starting a copying operation through a keyboard 227, the operation indication control circuit 228 detects this key being pressed and then sends to the system control unit 203 a request for starting a copying operation. Upon receiving the request, the system control unit 203 instructs the related control circuitry, such as, the scanner control circuit 209, the printer control circuit 221, and so forth, to start a copying operation. Accordingly, other control circuitry starts to control each unit to perform the above-mentioned operation so as to execute a twin color copying operation with a desired color.

Referring further to FIG. 4(c), when the operator presses "COLOR SELECT" in the exemplary menu page, the operation indication control circuit 228 displays in response a menu page similar to that shown in FIG. 3(c). Since this menu page is to select a desired color, the operator can cancel the twin color mode by pressing a key other than "TWIN COLOR".

As is described above, in the embodiment of the color copying apparatus, a twin color mode can be selected in an extremely simple way by pressing "TWIN COLOR" in a color mode selection page. Further, a desired color for the twin color mode can also be selected in an extremely simple way by pressing an indication for a desired color.

Next, details of the color correction processing of the color correction circuit 214 is explained with reference to FIG. 5. In the following explanation, a toner recording value corresponding to each development device C, M, Y, and K is represented by each letter with an attached numeral, such as, $C_1$, $M_1$, $Y_1$, or $K_1$, respectively.

Figure 5A:
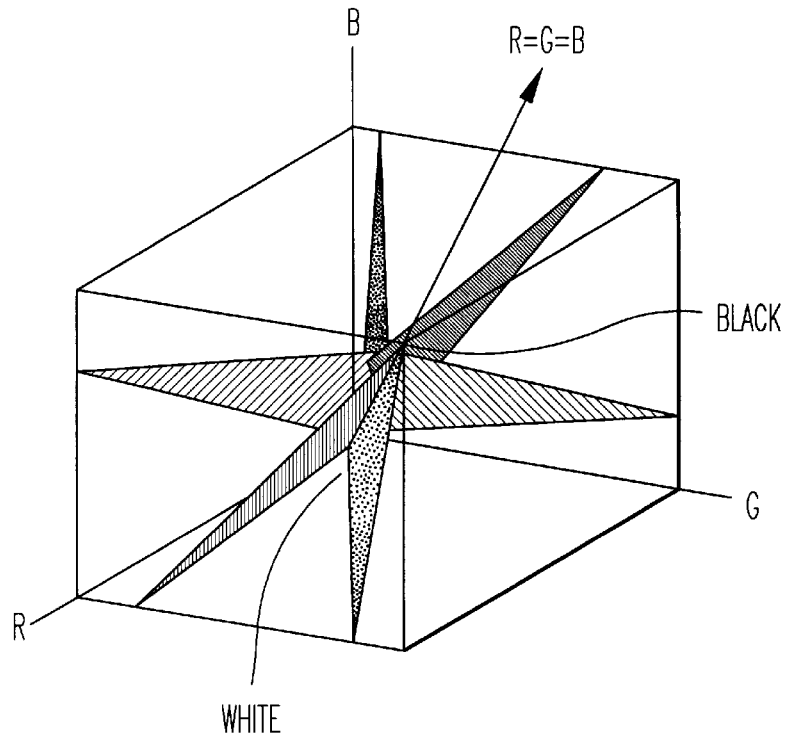
FIGS. 5(a) and 5(b) are illustrations for explaining color correction processing performed by a color correction circuit of the color copying apparatus shown in FIG. 1.

On the basis of three color elements R, G, and B, a conceptual structure of color is modeled by a space made of three axes, a R axis, a G axis, and a B axis as shown in FIG. 5(a), which space may henceforth be referred to as a color space. When values of the colors R, G, and B equal 0, a mixture of R, G, and B represents a white color, which is referred to as an achromatic color. Further, when values of the colors R, G, and B are at their utmost values and are equal to each other, a mixture of them represents a black color. Any point appearing on a line between the point of the white color and the point of the black color accordingly represents an achromatic color, which line may henceforth be referred to as an achromatic axis.

On the basis of color determination of an input image signal by R, G, and B, the color correction processing of the embodiment according to the present invention is performed in the following manner. First, the above-mentioned color space is divided by a predetermined number of planes spokewise expanding from the above-mentioned achromatic color axis. Second, a predetermined masking coefficient is provided to each of the divided color spaces. Third, one specific divided color space is determined in which the color representing the input image signal of R, G, and B is positioned, and a specific point in the specific divided color space is then determined at which the color representing the input image signal of R, G, and B is positioned. The position of the color representing the input image signal of R, G, and B is thus specified, and the color representing the input image signal of R, G, and B then receives a color correction processing in which the predetermined masking coefficient provided to each one of the divided color spaces is used.

Figure 5B:
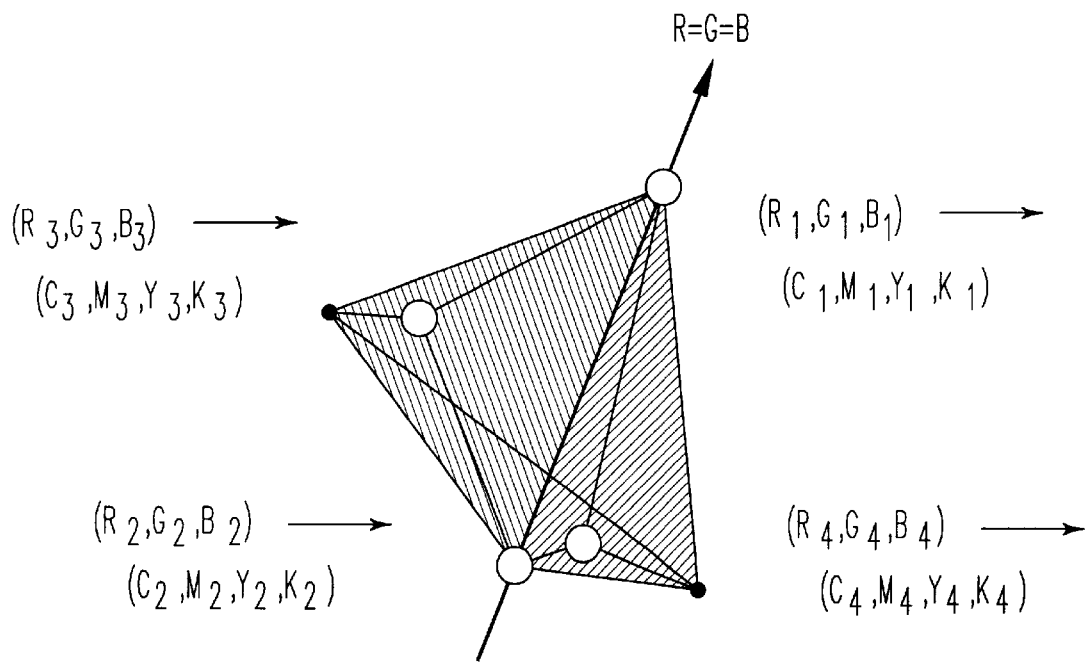

The masking coefficient provided to each one of the divided color spaces is obtained in the following manner, as shown in FIG. 5(b). First, a total of four points, which are different each other, each representing a color of R, G, and B are predetermined; two points on the achromatic color axis are specified as a first point for a color of $R_1$, $G_1$, and $B_1$ and a second point for a color of $R_2$, $G_2$, and $B_2$, and the remaining two points, one of which is not on the achromatic color axis but on a bordering plane and the other of which is not on the achromatic color axis but on another bordering plane, are respectively specified as a third point of a color of $R_3$, $G_3$, and $B_3$ and a fourth point of a color of $R_4$, $G_4$, and $B_4$. Second, a total of four sets of the color recording values of the respective development devices C, M, Y, and K, which are suitable to reproduce faithfully the above-specified four different colors each expressed in R, G, and B, are predetermined; a first set is defined as of $C_1$, $M_1$, $Y_1$, and $K_1$, a second set as of $C_2$, $M_2$, $Y_2$, and $K_2$, a third set as of $C_3$, $M_3$, $Y_3$, and $K_3$, and a fourth set as of $C_4$, $M_4$, $Y_4$, and $K_4$. After that, the masking coefficient is calculated with the following equation:

$$\begin{bmatrix} A_{cr} & A_{cg} & A_{cb} & A_c \\ A_{mr} & A_{mg} & A_{mb} & A_m \\ A_{yr} & A_{yg} & A_{yb} & A_y \\ A_{kr} & A_{kg} & A_{kb} & A_k \end{bmatrix} = \begin{bmatrix} C_1 & C_2 & C_3 & C_4 \\ M_1 & M_2 & M_3 & M_4 \\ Y_1 & Y_2 & Y_3 & Y_4 \\ K_1 & K_2 & K_3 & K_4 \end{bmatrix} \times \begin{bmatrix} R_1 & R_2 & R_3 & R_4 \\ G_1 & G_2 & G_3 & G_4 \\ B_1 & B_2 & B_3 & B_4 \\ 1 & 2 & 3 & 4 \end{bmatrix}$$

In the case described above, the color recording values of the respective development devices C, M, Y, and K at each specified color position are defined as values converted from values of image density of an achromatic color equivalent to a color before a UCR (under color removal) processing is performed, which converted values may henceforth be referred to as converted values from equivalent achromatic color image density. For the sake of simplicity, two color positions on the achromatic color axis are henceforth specified such that one is a point representing a white color and the other is a point representing a black color. In this case, if a maximum converted value from equivalent achromatic color image density is specified as $X_{max}$, the above-mentioned color recording values of the respective development devices C, M, Y, and K at each specified color position have the following relationships:

(1) for the white point; $R_1=G_1=B_1=C_1=M_1=Y_1=0 \geq K_1$ (2) for the black point; $R_2=G_2=B_2=C_2=M_2=Y_2=X_{max} \geq K_2$ Further, the above-mentioned two points, one of which is not on the achromatic color axis but on a bordering plane and the other of which is not on the achromatic color axis but on another bordering plane, are preferably set each at a point at which the minimum recording values of the respective development devices C, M, Y, and K become 0, and at which the maximum recording values of the respective development devices C, M, Y, and K become $X_{max}$, as shown in the following equations. In other words, each one of these two points is preferably set at a point which is the highest chroma point among all recordable points in each bordering plane.

$$Min(C_3, M_3, Y_3) = 0 \geq K_3$$

$$Max(C_3, M_3, Y_3) = X_{MAX}$$

$$Min(C_4, M_4, Y_4) = 0 \geq K_4$$

$$Max(C_4, M_4, Y_4) = X_{MAM}$$

At this time, the UCR ratio is controlled by determining a color recording value of the development device K on the basis of the minimum value of the development devices C, M, and Y, as shown in the following conditional equations:

(1) in a case of 100% UCR; K Min(C, M, Y)

(2) in a case of 70% UCR; K=Min(C, M, Y)×0.7

When a color space of R, G, and B is divided by six bordering planes, as an example, and as shown in FIG. 5(a), values of R, G, and B at a total of eight positions including at least six positions on each bordering plane and two positions both on the achromatic color axis are required to be predetermined. Further, color recording values of the respective development devices C, M, Y, and K suitable to reproduce faithfully the above-mentioned colors at a total of eight positions are also required to be predetermined. A masking coefficient provided to each divided color space is then obtained based on these predetermined values.

The above description for explaining a procedure for obtaining a masking coefficient is made based on a copying operation in a full color mode of the color copying apparatus. Next, a procedure for obtaining a masking coefficient in a twin color mode of the color copying apparatus according to the present invention is explained. In the twin color mode, an achromatic color portion of an image of an original document is reproduced with the achromatic color as it is. Further, with respect to other image portions of the image of the original document, the image is reproduced through a color processing in which a mixing ratio of a designated color is controlled to increase with increasing chroma of a color of the image. Because of this color processing, a masking coefficient is obtained by using a color recording value of a designated development device C, M, Y or K, instead of color recording values of the respective development devices C, M, Y, and K at a position on a bordering plane.

As already described above, the two points, one of which is not on the achromatic color axis but on a bordering plane and the other of which is not on the achromatic color axis but on another bordering plane, are preferably set each at a point at which the minimum recording values of the respective development devices C, M, Y, and K become 0, and at which the maximum recording values of the respective development devices C, M, Y, and K become $X_{MAX}$. A purpose of this setting is to prevent, in a simple way, from disturbing an evenness in a relationship between a degree of a chroma of a color and a mixing ratio of the colors C, M, Y, and K by each color (hue) of an original document. Of course, the conditions of the above-mentioned two points, that one of which is not on the achromatic color axis but on a bordering plane and that the other of which is not on the achromatic color axis but on another bordering plane, may not be an absolute requirement. That is, if the color recording value of the designated development device C, M, Y or K alternatively applied is properly corrected by considering the above-mentioned evenness at a process of obtaining a masking coefficient, the conditions of the above-mentioned two points may not be needed.

Further, in the twin color mode, it is possible to implement a processing in which only a black toner may be used to record an image of an original document when a color of the image is determined as a color close to an achromatic color range from a white color, through a gray color, to a black color, while a designated color may be used to record an image of an original document when a color of the image is determined as a color of a relatively high chroma. In this case, a masking coefficient is obtained in the following manner of color recording value settings.

First, color recording values of development devices C, M, and Y representing a black point are set as a reduced value (X2=0, for example) as shown below. Second, color recording values of development devices C, M, Y, and K representing a color of a point on a bordering plane are set as the color recording values of the development devices C, M, Y, and K representing the designated color.

$$R_2 = G_2 = B_2 = K_2' > C_2' = M_2' = Y_2' = X_2'$$

When a masking coefficient is used, which is obtained in the above-mentioned manner in which color recording values of the development devices C, M, Y, and K representing a designated color are used instead of color recording values of the development devices C, M, Y, and K representing a color of a point on a bordering plane, a lightness of each color is not controlled in the process. That is, a lightness of a designated color when representing a yellow color of a high lightness, for example, becomes the same lightness of the same designated color when representing a blue color of a low lightness, for example. However, if the masking coefficient is obtained in the following manner, a lightness of each color can be controlled so that a yellow color of a high lightness, for example, is reproduced by a thin designated color and a blue color of a low lightness, for example, is reproduced by a thick designated color.

$$X' = \frac{W_r \times R + W_g \times G + W_b \times B}{(W_r + W_g + W_b) \times X_{MAX}} \times X$$

Next, an operation of the color correction circuit 214 is explained in detail with respect to an exemplary circuit shown in FIG. 6. Image signals 601r, 601g, and 601b from the gamma conversion circuit 212 are input to filter circuits 602r, 602g, and 602b, respectively. The filter circuits 602r, 602g, and 602b provide the image signals 601r, 601g, and 601b with a two dimensional filtering processing on the basis of selected coefficients from among a number of coefficients as shown in FIG. 7, as examples. The filter circuits 602r, 602g, and 602b each receive a control signal 604, for selecting a coefficient from among a number of coefficients, from a filter circuit 603. As a result of performing the two dimensional filtering processing, the filter circuits 602r, 602g, and 602b output signals 605r, 605g, and 605b to a first color correction circuit 606 and a second color correction circuit 607. In addition, the filter circuits 602r, 602g, and 602b each output signals 608r, 608g, and 608b to a coefficient selecting circuit 609, regardless of the control signal 604. The signals 608r, 608g, and 608b are signals which result from performing a smoothing processing with using a filter coefficient #0, for example, as shown in FIG. 7(a).

The filter control circuit 603 generates and outputs the control signal 604 in response to a determination signal 610 from the image zone separation circuit 213, a switching signal 611 from the zone control circuit 215, and a setting signal 620 from the image processing control circuit 218. The image processing control circuit 218 sends the setting signal 620 to set the filter control circuit 603 so that a filter coefficient is selected from among #0 through #7 as shown in FIG. 8 in accordance with the required level of image quality.

A coefficient selection circuit 609 determines a position of a color, designated by input image signals 608r, 608g, and 608b, in the divided color space of R, G, and B as shown in FIG. 5(a). Further, in response to the determination result, the determination signal 610 and the switching signal 611, the coefficient selection circuit 609 selects a pair of masking coefficients for each of the color toner, C toner, M toner, and Y toner, and the black toner both designated by the image processing control circuit 218, and outputs a pair of these masking coefficients as coefficient signals 612 and 613 to color conversion circuits 606 and 607, respectively.

Generally, a plane including one of the planes shown in FIG. 5(a) is expressed by a following equation:

$r \times R + g \times G + b \times B = 0 (r+g+b=0)$

Therefore, the coefficient circuit 609 calculates a following equation by every border plane and comprehensively evaluates whether a result of this calculation is positive or negative and so forth, in determining a position of a color, designated by input image signals 608r, 608g, and 608b, in the divided color space of R, G, and B:

$f(R,G,B) = r \times R + g \times G + b \times B$

The image processing control circuit 218 obtains a masking coefficient for each divided area in the color space by conducting the above-mentioned operations in accordance with a required color mode and so forth. The thus obtained masking coefficient is transferred to the coefficient selection circuit 609 through the setting signal 620 by the image processing control circuit 218.

The color conversion circuits 606 and 607 include an operational circuit expressed by a following equation. On the basis of the received image signals 605r, 605g, and 605b and the received coefficient signals 612 and 613, the color conversion circuits 606 and 607 use this operational circuit to generate image signals 614 and 615 as a color toner recording signal and a black toner recording signal, respectively. In an actual procedure of outputting these image signals 614 and 615, the color conversion circuits 606 and 607 conduct signal processing more than one expressed by the following equation. For example, when a result of an operation becomes negative, the result is made zero.

$X = A_{xr} \times R + A_{xg} \times G + A_{xb} \times B + A_x$

An under color removal (UCR) circuit 616 deducts the black toner recording signal 615 from the color toner recording signal 614, and outputs a resultant color toner recording signal 617. In an actual procedure of outputting this signal 617, the UCR circuit 616 conducts signal processing more than deduction. For example, when a result of an operation becomes negative, the result is made zero.

A selection circuit 618 selects input signals and acts as a gate circuit of the black toner recording signal 615 output from the color conversion circuit 607 and the color toner recording signal 617 output from the UCR circuit 616. When the printer unit 102 selects the development device K of the development unit 118, the selection circuit 618 selects the black toner recording signal 615, while the selection circuit 618 selects the color toner recording signal 617 when the printer unit 102 selects the development devices of color toner C, M, or Y of the development unit 118. In this way the selection circuit 618 selects one of the signals 617 and 618 and outputs it as an image signal 619.

As explained above, this novel color copying apparatus embodying the present invention achieves reproduction of an image in two desired colors in superior quality with only a simple setting of masking coefficients and without extra and special devices. For enabling this simple setting of masking coefficients, the novel color copying apparatus embodying the present invention divides a color space defined by R, G, and B, for example, into six divided color spaces by having the same numbers of planes, each of which includes an achromatic color axis as a common side and a vertex extending to a direction different from other vertices of adjacent planes. The achromatic color axis is defined by equation of $R = G = B$ as mentioned above. Further, when receiving an input signal defined by R, G, and B, the novel color copying apparatus determines where a color represented by this input signal is located in the six divided color spaces, and then conducts color correction by using masking coefficients reserved for each of the six divided color spaces. Thereby, reproduction of an image in two desired colors is made possible by handling colors in the following manner.

As an example, an image having an achromatic color, such as a black, a gray, and a white color, of an image of an original document is reproduced as it is in such an achromatic color. At the same time, an image having a chromatic color of the image of the original document is reproduced in a mixed color of two designated colors in a way such that a mixing ratio of these two designated colors to make the mixed color increases with increasing chroma of a color of the image of the original document.

As another example, when a color of an image of an original document is relatively near to an achromatic color defined as a white, a gray, and a black color, the image is reproducing with using only a black toner. At the same time, when a color of the image of the original document has a relatively high chroma color, the image is reproduced by using a designated color.

As a novel feature of the color copying apparatus embodying the present invention, a specific point or color represented on a surface of a dividing plane of the six divided color spaces can be eliminated when reproduction of an image from an original document in two desired colors is made. This feature is achieved by correcting a recording value of the development devices C, M, Y, and K for the specific point or color desired to be eliminated into a recording value represented by a following equation, instead of a recording value of the development devices C, M, Y, and K for a designated color. To facilitate this feature, the color copying apparatus according to the present invention may include an element and operation for designating such a specific color mentioned above.

$$C_x = M_x = Y_x = K_x = 0$$

As another novel feature of the color copying apparatus embodying the present invention, a specific point or color represented on a surface of a dividing plane of the six divided color spaces can be memorized as a point or color reproduced in a black color when reproduction of an image from an original document in two desired colors is made. This feature is achieved by correcting a recording value of the development devices C, M, Y, and K for the specific point or color desired to be recorded in a black color into a recording value represented by a following equation, instead of a recording value of the development devices C, M, Y, and K for a designated color. To facilitate this feature, the color copying apparatus according to the present invention may include an element and operation for designating such a specific color mentioned above.

$$C_x = M_x = Y_x = X_{max} = \geq K_x$$

As another novel feature of the color copying apparatus embodying the present invention, an image of an achromatic color defined by a white, a gray, and a black color of an image of an original document can be reproduced in an arbitrarily designated color when reproduction of the image from the original document in a desired two colors is made. This feature is achieved by correcting a recording value of the development devices C, M, Y, and K for a black color into a recording value of the development devices C, M, Y, and K for the arbitrarily designated color. To facilitate this feature, the color copying apparatus according to the present invention may include a means for designating an arbitrary color.

As a further novel feature, the color copying apparatus embodying the present invention conducts reproduction of an image of an original document in two desired colors in a relatively short operation time without an extra operation time. This is because when the color copying apparatus is in a two color copying operation, in accordance with selected colors, the printer control circuit 221 and so forth conduct a sequential procedure for reproducing an image in two colors, which procedure is similar to a normal copying procedure, for example, for reading an image of an original document, forming an electrostatic latent image, forming a visualized image by toner, transferring the visualized image to the transferring belt 119, and again transferring the image formed with color toner on the transferring belt 119 to the surface of recording paper.

Yet, the embodiment of the color copying apparatus explained above includes only one means for forming an electrostatic latent image so that a cycle of forming an electrostatic latent image is repeated to complete a process of image reproduction. A color copying apparatus including a plural number of means for forming an electrostatic latent image may embody the present invention as well.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A color image forming apparatus operable in a twin-color mode for forming an image in only first and second predetermined colors, comprising:

image reading means for reading an image of an original document by separating a color of said image into a plurality of color elements and for generating a plurality of image signals corresponding to said plurality of said color elements;

image processing means for, in the twin-color mode, processing said plurality of said image signals output from said image reading means in a predetermined manner, for distinguishing between only a first case that said plurality of said image signals define a chromatic color and a second case that said plurality of said image signals define an achromatic color, for converting said color into the first predetermined color when said first case is defined, for converting said color into the second predetermined color when said second case is defined; and, recording means for recording a duplicate image in the first predetermined color when said first case is defined, and for recording the duplicate image in the second predetermined color when said second case is defined.

2. A color image forming apparatus according to claim 1, further comprising color designating means for designating a color for being reproduced, and wherein said image processing means selects said color designated by said color designating means as one of said first and second predetermined colors.

3. A color image forming apparatus according to claim 1, wherein said image processing means includes color correction means for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements by using a plurality of predetermined coefficients reserved for each of said plurality of said space units in said color space.

4. A color image forming apparatus according to claim 2, wherein said image processing means includes color correction means for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements with using a plurality of predetermined coefficients reserved for each of said plurality of said space units in said color space.

5. A color image forming apparatus operable in a twin-color mode for forming an image in only first and second predetermined colors, comprising:

image reading means for reading an image of an original document by separating a color of said image into a plurality of color elements and for generating a plurality of image signals corresponding to said plurality of said color elements;

image processing means for processing said plurality of said image signals output from said image reading means in a predetermined manner, for analyzing a level of chroma of said color defined by said plurality of said corresponding image signals, for converting said color into a mixed color of only the first predetermined color or the second predetermined color with a predetermined mixing ratio in accordance with said level of chroma of said color; and, recording means for recording a duplicate image in said mixed color.

6. A color image forming apparatus according to claim 5, further comprising color designating means for designating a color for being reproduced, and wherein said image processing means selects said color designated by said color designating means as one of said first and second predetermined colors.

7. A color image forming apparatus according to claim 5, wherein said image processing means includes color correction means for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements with using a plurality of predetermined coefficients reserved for each of said plurality of said space units in said color space.

8. A color image forming apparatus according to claim 6, wherein said image processing means includes color correction means for defining a plurality of space units in a color space by dividing said color space by a same plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements with using a plurality of predetermined coefficients reserved for each of said plurality of said space units in said color space.

9. A color image forming apparatus operable in a twin-color mode for forming an image in only first and second predetermined colors, comprising:

a scanner for reading an image of an original document by separating a color of said image into a plurality of color elements and for generating a plurality of image signals corresponding to said plurality of said color elements;

an image processor for, in the twin-color mode, processing said plurality of said image signals output from said scanner in a predetermined manner, for distinguishing between only a first case that said plurality of said image signals define a chromatic color and a second case that said plurality of said image signals define an achromatic color, for converting said color into the first predetermined color when said first case is defined, for converting said color into the second predetermined color when said second case is defined; and, a printer for recording a duplicate image in the first predetermined color when said first case is defined, and for recording the duplicate image in the second predetermined color when said second case is defined.

10. A color image forming apparatus according to claim 9, further comprising a color designator for designating a color for being reproduced, and wherein said image processor selects said color designated by said color designator as one of said first and second predetermined colors.

11. A color image forming apparatus according to claim 9, wherein said image processor includes a color corrector for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements by using a plurality of predetermined coefficients reserved for each of said plurality of said space units in said color space.

12. A color image forming apparatus according to claim 10, wherein said image processor includes a color corrector for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements by using a plurality of predetermined coefficients reserved for each of said plurality of said space units in said color space.

13. A color image forming apparatus operable in a twin-color mode for forming an image in only first and second predetermined colors, comprising:

a scanner for reading an image of an original document by separating a color of said image into a plurality of color elements and for generating a plurality of image signals corresponding to said plurality of said color elements;

an image processor for processing said plurality of said image signals output from said scanner in a predetermined manner, for analyzing a level of chroma of said color defined by said plurality of said corresponding image signals, for converting said color into a mixed color of only the first predetermined color or the second predetermined color with a predetermined mixing ratio in accordance with said level of chroma of said color; and, a printer for recording a duplicate image in said mixed color.

14. A color image forming apparatus according to claim 13, further comprising a color designator for designating a color for being reproduced, and wherein said image processor selects said color designated by said color designator as one of said first and second predetermined colors.

16. A color image forming apparatus according to claim 14, wherein said image processor includes a color corrector for defining a plurality of space units in a color space by dividing said color space by a plurality of planes, each plane having an achromatic color axis as a common interfacing axis and a vertex extending to a direction different from other vertices of adjacent planes, for determining a position of said color in one of said plurality of said space units in said color space, and for correcting each of said plurality of said color elements by using a plurality of predetermined coefficients reserved for each of said plurality of said space units in said color space.

15. A color image forming apparatus according to claim 13, wherein said image processor includes a color corrector for defining a plurality of space units in a color space by dividing said color space by a plurality of planes, each plane having an achromatic color axis as a common interfacing axis and a vertex extending to a direction different from vertices of adjacent planes, for determining a position of said color in one of said plurality of said space units in said color space, and for correcting each of said plurality of said color elements by using a plurality of predetermined coefficients reserved for each of said plurality of said space units in said color space.

* * * * *